United States Patent [19]
Anderson et al.

[11] 3,781,638
[45] Dec. 25, 1973

[54] POWER SUPPLY INCLUDING INVERTER HAVING MULTIPLE-WINDING TRANSFORMER AND CONTROL TRANSISTOR FOR CONTROLLING MAIN SWITCHING TRANSISTORS AND PROVIDING OVERCURRENT PROTECTION

[75] Inventors: Thomas E. Anderson; John P. Walden, both of Schenectady, N.Y.

[73] Assignee: General Electric Company, Schenectady, N.Y.

[22] Filed: June 28, 1972

[21] Appl. No.: 267,262

[52] U.S. Cl. .................... 321/14, 321/2, 331/113 A
[51] Int. Cl. ............................................. H02m 3/32
[58] Field of Search ............................ 321/2, 4, 14; 331/113 A

[56] References Cited
UNITED STATES PATENTS

| | | | |
|---|---|---|---|
| 3,248,640 | 4/1966 | Wellford | 331/113 A |
| 3,067,378 | 12/1962 | Paynter | 331/113 A |
| 3,119,056 | 1/1964 | Hatke et al. | 331/113 A |
| 3,308,397 | 3/1967 | Morgan | 331/113 A |

Primary Examiner—A. D. Pellinen
Attorney—John F. Ahern et al.

[57] ABSTRACT

A power supply includes a high frequency inverter comprising a pair of main switching transistors for alternately conducting current from a d.c. source through different winding halves of a multi-winding transformer. A starting resistor, connected between the source and the base of a selected one of the main transistors, initiates base-emitter current flow to make the transistor conductive. A control transistor turns the then conducting main transistor "off" in response to a predetermined current level through the conducting main transistor; the predetermined current level having been reached in response to the onset of magnetic saturation of the core of the transformer. Subsequently, a voltage induced in a third transformer winding initiates base-emitter current flow in the other main transistor thereby turning it "on". Also, the control transistor serves to turn either main switching transistor "off" when the current therethrough is excessive, (e.g., overload or short-circuit condition).

9 Claims, 1 Drawing Figure

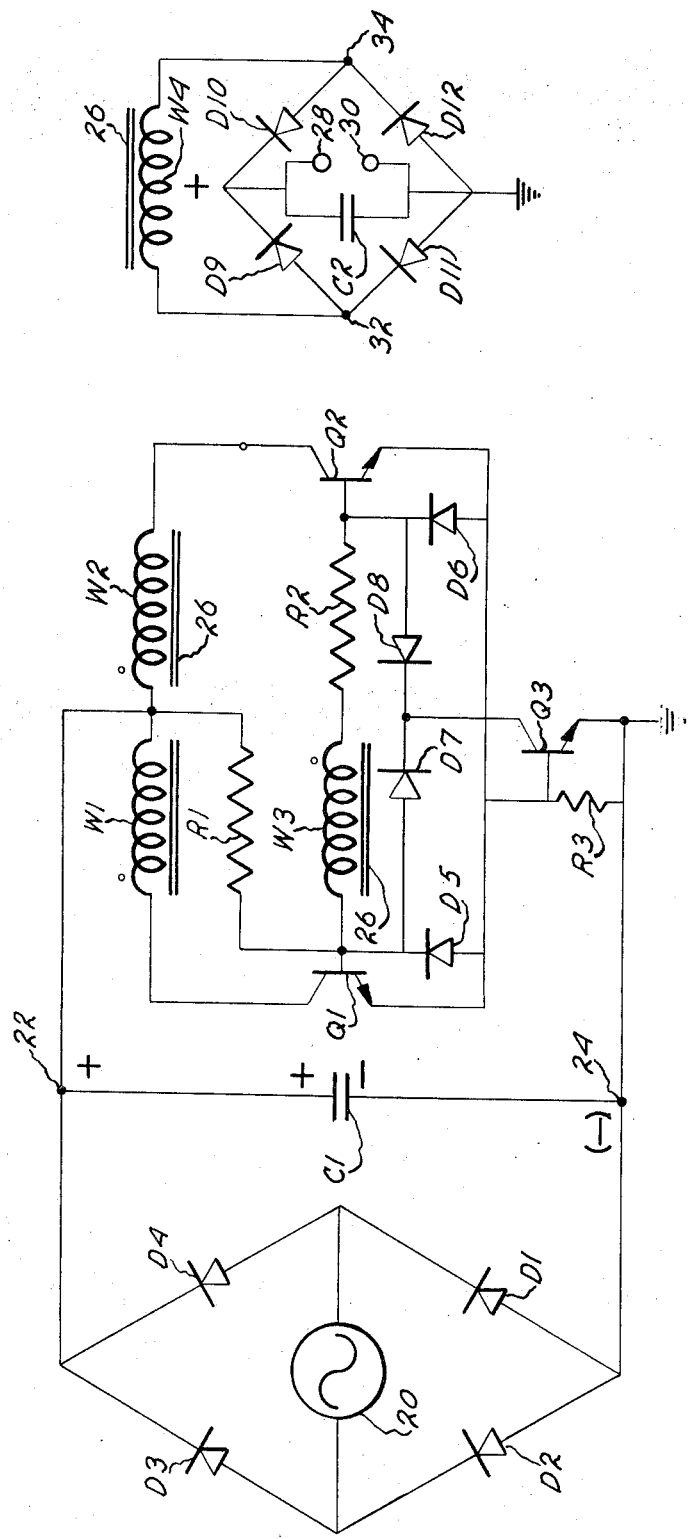

3,781,638

POWER SUPPLY INCLUDING INVERTER HAVING MULTIPLE-WINDING TRANSFORMER AND CONTROL TRANSISTOR FOR CONTROLLING MAIN SWITCHING TRANSISTORS AND PROVIDING OVERCURRENT PROTECTION

BACKGROUND OF THE INVENTION

The subject invention pertains, in general, to a power supply for providing an isolated low voltage output from a conventional input (e.g., 115 v, single phase, 60 Hz); and, more particularly, to a power supply comprising a high frequency inverter employing switching transistors and a control transistor in combination with a multi-winding transformer having a magnetic core which is fully utilized, said control transistor functioning to prevent switching transistor overcurrent occasioned, for example, by a short circuit output condition.

Most conventional power supplies designed for delivering low voltage outputs usually employ magnetic circuit elements, such as transformers, which are operated from 50-60 Hz electric power sources. At such frequencies transformer cores are rather weightly and bulky; often, the cores are not efficiently utilized, magnetically. Thus, conventional power supplies of the kind described are not suitable for applications such as being incorporated in appliance line cords or hung from a 115 volt ac wall outlet.

SUMMARY OF THE INVENTION

One object of the invention is to provide a relatively compact low voltage power supply which, being neither weighty nor bulky, can be incorporated in appliance cords or supported from a conventional 115 volt ac wall outlet.

Another object of the invention is to provide a relatively compact power supply having an isolated low voltage output.

Another object of the invention is to provide a power supply comprising an inverter which operates at a relatively high frequency, said inverter including a multiwinding transformer having a relatively small magnetic core which is efficiently used, magnetically.

Another object of the invention is to provide an inverter comprising a transformer including a magnetic core in which the onset of magnetic saturation initiates "turn-off" of main current switching transistors.

Another object of the invention is to provide an inverter employing a control transistor in addition to main current switching transistors for, among other purposes, turning off said switching transistors when the current therethrough exceeds a predetermined magnitude occasioned by, among other causes, a shorted output circuit condition.

Another object of the invention is to provide a power supply including a high frequency inverter for delivering an isolated low voltage output, said power supply employing a minimum number of relatively small, light weight non-integratable components so that the power supply may be mainly manufactured in monolithic or power module form.

In accordance with one embodiment of the invention there is provided a power supply comprising an inverter including first and second switching transistors connected to opposite ends of a center-tapped primary winding of a transformer. A starting resistor connecting a positive potential applied to the center tap of the primary winding conducts current to the base of the first switching transistor and turns the first transistor "on." An auxiliary winding on the transformer core, together with associated circuit means, is instrumental in providing the driving voltage needed for maintaining base current flow in the first transistor and keeping the first transistor "on." At the onset of saturation of the transformer core current flowing through the collector-emitter circuit of the first switching transistor increases. A third, or control, transistor is turned "on" in response to the aforementioned increased current and functions to divert base current from the first switching transistor thereby turning it "off." "Turn-off" of the first switching transistor causes the third, or control, transistor to turn "off." The auxiliary winding again develops a driving voltage and, together with circuitry associated therewith, causes base current flow in the second switching transistor thereby causing the second switching transistor to become turned "on." The auxiliary winding and its associated circuitry maintain the second switching transistor in its "on" condition by maintaining its base current flow. Eventually, the onset of transformer core saturation causes an increased current flow in the collector-emitter circuit of the second switching transistor. This increased current flow causes the third, or control, transistor to become turned "on" thereby turning the second transistor "off". When the second transistor turns "off" the control transistor also becomes turned "off". Subsequently, the first switching transistor is turned on by the action just described for the second switching transistor whereby the cycle is repeated.

An important feature of the invention resides in employing a third, or control, transistor which can be made to conduct in response to a predetermined high current level appearing in the primary of the transformer due to a short circuit condition in the output of the transformer. This high current level can be reached well before the onset of saturation in the transformer core and is effective to make the third, or control transistor conductive and thereby initiate switching activity of the main switching transistors and effectively protect the circuit during overloads or short circuits in the transformer output. In the illustrative embodiment of the invention, hereinafter described in detail, the value of a resistor connected between the base and emitter of the third or control, transistor is selected so as to develop a sufficient IR drop at the predetermined high current level in the transformer primary to turn the third, or control, transistor on thereby initiating switching action of the switching transistors to protect the circuit during the short circuit conditions.

Another feature of the invention resides in the employment of an auxiliary winding on the aforementioned transformer core for providing an induced voltage functioning together with associated circuit means for maintaining switching transistors in their conductive, or "on," condition by the maintenance of base current flow.

Other objects, features and advantages of the invention appear hereinafter where a specific illustrative embodiment of the invention is set forth in detail with reference to the accompanying drawing FIGURE.

DESCRIPTION OF PREFERRED EMBODIMENT

In the schematic illustration in the drawing FIGURE one exemplary embodiment of an ac-dc-ac-dc converter, in accordance with the invention, is shown in detail. An ac source 20 of 115 volts, 50–60 Hz, 1 ϕ is connected in the conventional way with a full-wave bridge rectifier comprising the four diodes D1, D2, D3 and D4. As is well understood ac electrical energy from the supply source 20 is converted to dc electrical energy by the full-wave bridge rectifier. The ac source 20 supplies a voltage, the magnitude of which varies sinusoidally as its polarity alternates during each half cycle. The diodes D4 and D2 conduct during one half cycle during which period the diodes D3 and D1 are nonconductive. During the next half cycle, the diodes D3 and D1 are conductive while the diode D4 and D2 are nonconductive. As a result, the full-wave bridge rectifier D1. . . . D4 supplies an undulating dc voltage, the amplitude of which varies sinusoidally for two successive half cycles. However, its polarity does not alternate. This undulating dc voltage supplied by the full-wave bridge rectifier is impressed across the capacitor C1. Thus, capacitor C1 is continuously charged during each half cycle and maintains the relative polarities shown by the + and − signs. The charged capacitor C1 smooths, or filters, the voltage undulations so that the voltage at the + plate of the capacitor, as well as at the junction point 22, is substantially constant with respect to the voltage at the − plate and the junction point 24.

The dc voltage appearing between the junction points 22 and 24 is the supply voltage for an inverter circuit which includes a pair of switching transistors Q1 and Q2, the collectors of which are connected to the ends of the transformer windings W1 and W2, respectively. The windings W1 and W2 have the same number of turns and, electrically, they are serially connected as shown; the windings W1 and W2 being bifilar wound, or two-in-hand wound, on the same magnetic core 26. Wound on the same magnetic core 26 are two additional windings W3 and W4. The winding W4 serves as a secondary, or output, winding having relatively fewer turns than the serially connected windings W1 and W2 which alternately serve as primary, or input, windings. The winding W3, or tertiary winding, and a resistor R2 form a series circuit which, as shown, is connected between the bases of the transistors Q1 and Q2. As shown, two oppositely poled diodes D7 and D8 connect the base electrodes of the transistors Q1 and Q2, respectively, to the collector electrode of another transistor Q3. The emitter of transistor Q3 is connected to the node 24 which is at ground potential. Another resistor R3 connects the base of transistor Q3 to ground potential. Also provided is a pair of diodes D5 and D6 which, as shown, connect one end of the resistor R3 with the bases of the transistors Q1 and Q2, respectively.

An isolated ac output voltage is developed across the output winding W4. This output voltage may be directly extracted from between the terminals 32 and 34. However, in the event that an isolated dc output voltage is required a full-wave bridge rectifier including the diodes D9, D10, D11 and D12 is provided. If desired, winding W4 can be a center tapped winding and a two diode full wave rectifier may be used. The isolated dc output voltage may be extracted from between the terminals 28 and 30 across which a filter capacitor C2 is connected.

With respect to the inverter circuit the transistors Q1 and Q2 are initially non-conducting, or in their "off" condition. However, when the charged capacitor C1 supplies voltage between the junction points, or nodes, 22 and 24 with the relative polarities shown, current flows through resistor R1, the base-emitter circuit of transistor Q1 and the resistor R3. As a result, transistor Q1 becomes conductive; i.e., is turned "on". When the transistor Q1 becomes conductive additional current passes through the winding W1, the collector-emitter circuit of transistor Q1 and the resistor R3. Current flow through the winding W1 produces a magnetic flux in the core 26; the magnetic flux linking with the winding W3 on the same core 26 and causing a voltage to be induced across the winding W3. The induced voltage across the winding W3 provides a driving voltage for sustaining the base-emitter current flow in transistor Q1 and thereby maintaining transistor Q1 in its "on," or conductive, condition. The aforementioned sustaining current flows in a closed loop which includes: the winding W3, the base-emitter circuit of transistor Q1, the diode D6 and the resistor R2; the resistor R2 serving as a current-limiting resistor for the bases of the transistors Q1 and Q2. The transistor Q1 remains in its conductive, or "on," condition until the magnetic core 26 begins to saturate, at which point the current in the collector-emitter circuit of the transistor Q1 begins to increase. As the magnetic core 26 begins to saturate the magnetic field therein begins to collapse causing the aforesaid increase in current through the collector-emitter circuit of transistor Q1. Increased current flow in the collector-emitter circuit of transistor Q1 causes an increased IR drop across the resistor R3. Consequently, the base-emitter voltage of the transistor Q3 increases thereby causing the transistor Q3 to become conductive; i.e., turn "on." When the transistor Q3 becomes conductive, current is diverted away from the base-emitter circuit of the transistor Q1 thereby causing transistor Q1 to become nonconductive; i.e., turn "off." The aforementioned current diversion path is from winding W3 through diode D7 and through the collector-emitter circuit of transistor Q3. However, once the transistor Q1 becomes nonconductive as a result of transistor Q3 becoming conductive and diverting base-emitter circuit current away from transistor Q1, transistor Q3 also becomes nonconductive, or turns "off". When transistor Q1 becomes non-conductive, current flow from the emitter of transistor Q1 and through the resistor R3 diminishes to a point where the IR drop across the resistor R3 is insufficient to drive the base-emitter circuit of transistor Q3 and maintain it in its conductive, or "on" condition. When transistors Q1 and Q3 become nonconductive the energy stored in the magnetic circuit including the core 26 causes a reversal of voltage across the winding W3 thereby causing reverse current to begin flowing in winding W3 and causes the transistor Q2 to become conductive; i.e., turn "on." This reversed voltage across winding W3 provides a base driving voltage for initiating and sustaining base-emitter current flow through transistor Q2 to maintain transistor Q2 in its "on," or conductive, condition. The current sustaining transistor Q2 in its conductive condition flows in the loop which includes: the winding W3, resistor R2, the base-emitter circuit of transistor Q2 and the diode D5. When transistor Q2 becomes conductive the main current from the junction point, or node, 22 flows through the winding W2, the collector-emitter circuit of transistor Q2 and resistor R3. The transistor Q2 remains in its conductive state until the magnetic core 26 begins to saturate, at which point the current through the transistor Q2 begins to increase due to the collapsing of the magnetic field in the magnetic core 26. The increased current flows through the collector-emitter of transistor Q2 and the resistor R3 until the IR drop across the resistor R3 causes transistors Q3 to turn "on." Transistor Q3 and diode D8 eventually act to divert current from the base-emitter circuit of transistor Q2 thereby causing transistor Q2 to beecome non-conductive. Subsequently, transistor Q3 turns "off" when transistor Q2 becomes non-conductive because no current flows from the emitter of transistor Q2 through resistor R3 to maintain transistor Q3 in its "on" condition. Thereafter, transistor Q1 again becomes conductive thereby commencing the inverter action in the manner hereinbefore described.

The onset of magnetic saturation of the core 26 can be made largely dependent on the magnitude of the resistance of resistor R3. Consequently, full utilization of the magnetic core 26 is achievable by selection of R3. Moreover, since the resistor R3 and the transistor Q3 function, at a certain threshold current through R3, to cause transistor Q3 to become conductive and thereby render transistor Q1 or Q2 non-conductive the inverter circuit will not become damaged in the event that a short-circuited output condition exists; e.g., across terminals 32 and 34 or across terminals 28 and 30. Therefore, since transistors Q3 turns "on" in response to the magnitude of the current flowing through the resistor R3 thereby diverting base current flow from transistor Q1 or transistor Q2 to turn these transistors "off," the combination of resistors R3 and transistor Q3 provides the aforesaid short circuit protection, even when the transformer is not near saturation.

Thus, there is provided, in accordance with the invention, a power supply providing an isolated low-voltage dc output; the power supply having a high efficiency, including output short circuit protection and operating from a conventional 115 volt ac, single phase, supply. The power supply includes a high frequency inverter circuit including means for limiting current through the inverter; the inverter employing a transformer having a magnetic core which is fully utilized. Moreover, excessive losses in the power supply circuit are avoided. The circuit according to the invention may be constructed in monolithic or power module form. The power supply circuit is neither bulky nor weighty so that it can be conveniently incorporated in a line cord and plugged into a conventional ac wall outlet. Some uses, among others, for the power supply of the invention are: a low voltage isolated power supply for a soldering iron, low voltage trouble light assembly, etc.

Although one more or less specific embodiment of the invention has been described and illustrated in the accompanying drawing FIGURE, it is to be understood that such description and illustration has been done for purposes of illustration and that the scope of the invention is not intended to be limited thereby, but, rather, is to be determined from the claims, hereinafter appearing, which define the invention. For example, PNP transistors may be used if the diodes D5, D6, D7 and D8 are reversely connected and if the positive and negative supply terminals 22 and 24 are reversed.

What is claimed is:

1. An inverter, adapted for being energized from a dc source having two terminals between which there is a potential difference, comprising: a transformer including a magnetic core on which there is wound a primary winding having a center tap to which one of said two terminals is connectable and two ends, a secondary winding adapted for having an electrical load coupled therewith and a tertiary winding; first and second transistors, each having a collector, emitter and base, said collectors of said first and second transistors being connected to different ones of said two ends of said primary winding; first impedance means connected between said center tap and said base of said first transistor; a third transistor having a base, collector and emitter, said emitter of said third transistor being adapted for having the other of said two terminals connected thereto, said base of said third transistor being connected to said emitters of said first and second transistors; second impedance means connected in series with tertiary winding, the serially connected tertiary winding and second impedance means being connected between the bases of said first and second transistors; first and second diodes, said first diode being connected between said bases of said second and third transistors, said second diode being connected between said bases of said first and third transistors; third and fourth diodes, said third diode being connected between said base of said first transistor and said collector of said third transistor, said fourth diode being connected between said base of said second transistor and said collector of said third transistor; third impedance means connected between said base and said emitter of said third transistor.

2. The inverter, according to claim 1, wherein said first, second and third impedance means are resistance elements.

3. The inverter, according to claim 1, wherein said first diode, said second impedance means, said tertiary winding and said base and emitter of said first transistor form a closed series circuit for maintaining base-emitter current flow in the first transistor due to an induced voltage developed in said tertiary winding.

4. The inverter, according to claim 3, wherein said second diode, said tertiary winding, said second impedance means and said base and emitter of said second transistor form a closed series circuit for maintaining base-emitter current flow in said second transistor due to an induced voltage developed in said tertiary winding.

5. The inverter, according to claim 4, wherein current is diverted through said third diode from the base-emitter path of said first transistor and directed through the collector and emitter of said third transistor when said first and third transistors are conductive.

6. The inverter, according to claim 5, wherein current is diverted through said fourth diode from the base-emitter path of said second transistor and directed through the collector and the emitter of said third transistor when said second and third transistors are conductive.

7. The inverter, according to claim 6, wherein current flow of a predetermined magnitude through the emitter of either said first transistor or said second transistor develops a voltage across said third impedance means for making said third transistor conductive.

8. The inverter, according to claim 7, wherein current of a predetermined magnitude through said primary winding begins to saturate said magnetic core whereby increased current flows in the emitter of either said first or second transistor and develops a voltage across said third impedance means to make said third transistor conductive.

9. The inverter, according to claim 6, wherein current of a predetermined magnitude through said primary winding develops a voltage across said third impedance means to make said third transistor conductive.

* * * * *